(12) United States Patent
Bagchi et al.

(10) Patent No.: US 8,185,227 B2
(45) Date of Patent: May 22, 2012

(54) METHOD AND SYSTEM FOR DETERMINING MANUFACTURING THROUGHPUT TARGET

(75) Inventors: Sugato Bagchi, Yorktown Heights, NY (US); Lindsay E. Burns, Hopewell Junction, NY (US); Steven C. Catlett, Hopewell Junction, NY (US); Ching-Hua Chen-Ritzo, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 314 days.

(21) Appl. No.: 12/685,393

(22) Filed: Jan. 11, 2010

(65) Prior Publication Data

US 2011/0172801 A1    Jul. 14, 2011

(51) Int. Cl.
*G06F 19/00* (2011.01)
(52) U.S. Cl. ........ 700/101; 700/102
(58) Field of Classification Search ......... 700/101, 700/102
See application file for complete search history.

(56) References Cited

U.S. PATENT DOCUMENTS

| | | | |
|---|---|---|---|
| 5,826,238 A | 10/1998 | Chen et al. | |
| 7,239,930 B2 | 7/2007 | Burda et al. | |
| 2009/0037012 A1* | 2/2009 | Weigang et al. | 700/101 |
| 2010/0168892 A1* | 7/2010 | Schmidt | 700/100 |

OTHER PUBLICATIONS

Miyashita, K. et al., "Simulation-based advanced WIP management and control in semiconductor manufacturing," Proceedings of the 2004 Winter Simulation Conference (2004) pp. 1943-1950.
Hopp, W.J. et al., "Setting WIP levels with statistical throughput control (STC) in CONWIP production lines," International Journal of Production Research (1998) pp. 867-882, vol. 36(4).
Hu, H. et al., "A dynamic WIP control strategy for bottlenecks in a wafer fabrication system," International Journal of Production Research (2009) pp. 1-13, iFirst.

* cited by examiner

*Primary Examiner* — Ryan Jarrett
(74) *Attorney, Agent, or Firm* — Scully, Scott, Murphy & Presser, P.C.; Daniel P. Morris, Esq.

(57) ABSTRACT

A first linear combination of a local moving aggregated quantity derived from a WIP distribution and a global aggregated quantity derived from the WIP distribution is calculated for each range for a given product type in a manufacturing line. The first linear combination serves as a first throughput target for the range and product. A second linear combination of a standard deviation of the non-zero portion of the WIP distribution and the global aggregated quantity is calculated for the product type in the manufacturing line. The coefficients of this second linear combination are predetermined. This second linear combination serves as a second throughput target. A throughput target for each range is determined by determining the minimum of the first throughput target, which can be different for each range, and the second throughput target, which is common across all ranges.

25 Claims, 5 Drawing Sheets

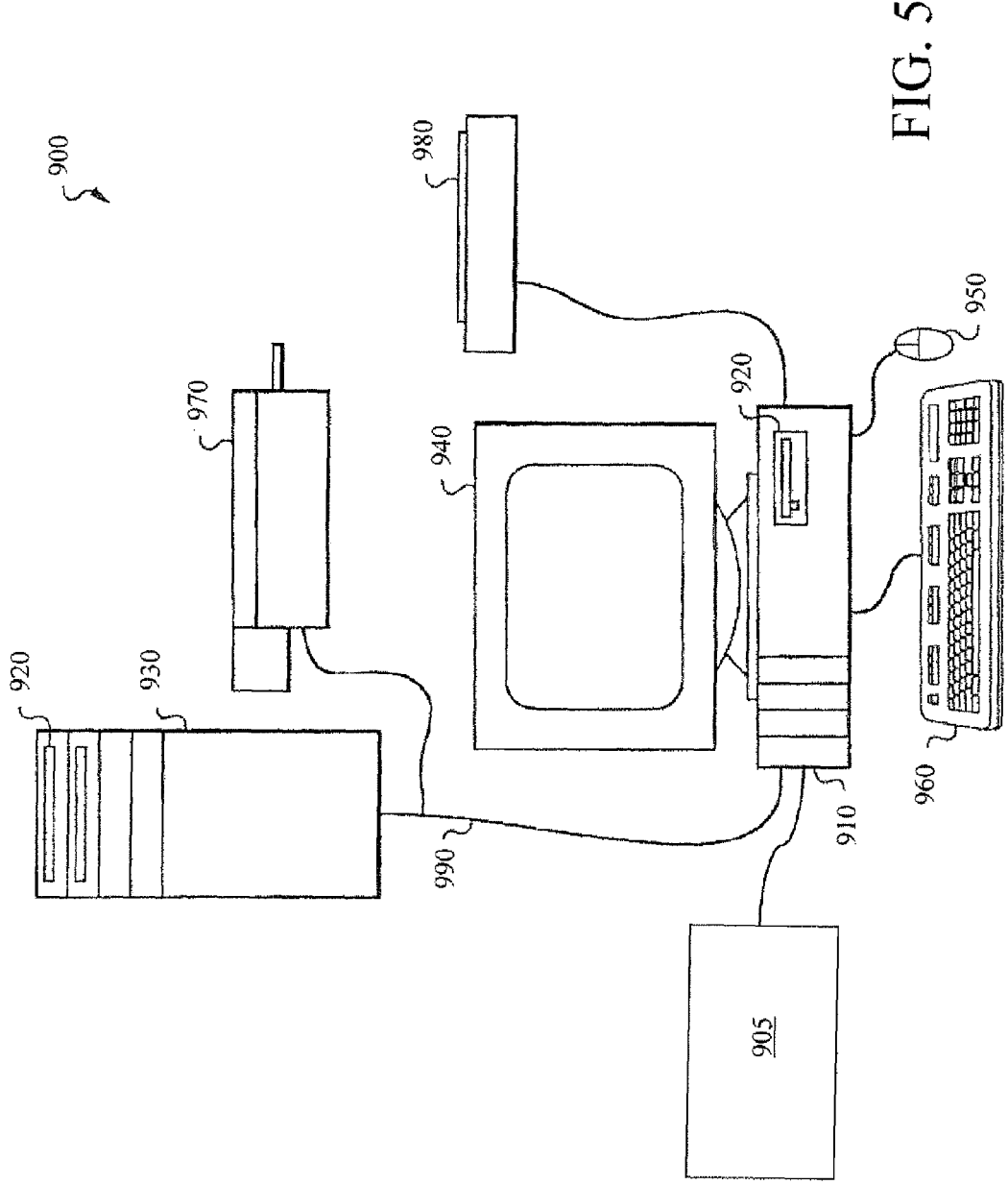

METHOD AND SYSTEM FOR DETERMINING MANUFACTURING THROUGHPUT TARGET

BACKGROUND

The present invention generally relates to a method and a system for determining manufacturing throughput targets for each product type produced at a manufacturing facility that employs a work-in-progress (WIP) management system.

Many industrial products require multiple sequential processing steps during manufacturing. The quantity of manufactured industrial products in a production facility can be maximized by any one of many different production management systems depending on the nature of the products, the variety of the products, and the complexity of the processes employed during individual manufacturing steps, and the distribution and uniformity of processing time for each manufacturing step.

A production management system commonly employed to manufacture products that require a large number of processing steps is called a work-in-progress (WIP) management system. Examples of prior art WIP management systems include those described in U.S. Pat. Nos. 5,826,238 to Chen et al. and 7,239,930 to Burda et al. K. Miyashita et al. "Simulation-based advanced WIP management and control in semiconductor manufacturing," Proc. 2004 Winter Simulation Conf., pp. 1943-1950 (2004), W. Hopp et al., "Setting WIP levels with statistical throughput control (STC) in CONWIP production lines," Int. J. Prod. Res., vol. 36, No. 4, pp. 867-882 (1998), H. Hu et al., "A dynamic WIP control strategy for bottlenecks in a wafer fabrication system," Int. J. Prod. Res. 2009, pp. 1-13 (2009).

Despite the availability of diverse methods for managing WIP in a production control system, processing data on current WIP distribution to derive a coherent WIP management plan that can handle a large number of product types and equitably balance the final output of these product types at production facilities has remained a difficult task when such methods have been applied in practice.

BRIEF SUMMARY

A first linear combination of a local moving aggregated quantity derived from a WIP distribution and a global aggregated quantity derived from the WIP distribution is calculated for each range for a given product type in a manufacturing line. The width of ranges used to compute the moving aggregated quantity and coefficients of the first linear combinations are predetermined before computing the linear combinations. The first linear combination serves as a first throughput target for the range and product. A second linear combination of a standard deviation of the non-zero portion of the WIP distribution and the global aggregated quantity is calculated for the product type in the manufacturing line. The coefficients of this second linear combination are predetermined. This second linear combination serves as a second throughput target. A throughput target for each range is determined by determining the minimum of the first throughput target, which can be different for each range, and the second throughput target, which is common across all ranges.

A non-limiting example of the local moving aggregated quantity is a weighted moving average over a specified interval of ranges. A non-limiting example of the global aggregated quantity is the mathematical average of the WIP in all ranges with non-zero WIP.

This method does not require extensive calculation based on the dataset for WIP and does not require predictions about capacity or other parameters. However, the throughput target generated by this method is reactive to abnormal WIP distributions such as WIP bubbles (high WIP values) around one or more ranges to provide a reasonable throughput target that can be realistically achieved in many production lines. Coefficients of the various linear combinations can be optimized to reflect unique characteristics of individual production lines, thereby enhancing the accuracy of the throughput targets provided by the formulae of the present invention. Further, appropriate values for the coefficients may vary by product line. In such cases, the values of the coefficients may be set independently for each product type.

According to an aspect of the present invention, a system for determining a target throughput for a product type in a manufacturing facility is provided. The system includes a computer and output means. The computer is configured to perform the steps of: determining, for each range in work-in-progress (WIP) distribution of a manufacturing sequence for the product type, a first throughput target given by a first linear combination employing a first subset of a set of scalar coefficients, wherein the first linear combination is a linear combination of a local moving aggregated quantity of an interval associated with the range and a global aggregated quantity of the WIP distribution; determining a second throughput target given by a second linear combination employing a second subset of the set of scalar coefficients, wherein the second linear combination is a linear combination of a standard deviation of a non-zero portion of the WIP distribution and the global aggregated quantity; and determining, for each selected range in the manufacturing sequence, a minimum of a first quantity and a second quantity, wherein the first quantity is the first throughput target for the selected range and the second quantity is the second throughput target. The output means is configured to output a set of the minimums for all i's as a set of throughput targets for the product type.

According to another aspect of the present invention, a method of determining a target throughput for a product type in a manufacturing facility is provided. The method includes: determining, for each range in work-in-progress (WIP) distribution of a manufacturing sequence for the product type, a first throughput target given by a first linear combination employing a first subset of a set of scalar coefficients, wherein the first linear combination is a linear combination of a local moving aggregated quantity of an interval associated with the range and a global aggregated quantity of the WIP distribution; determining a second throughput target given by a second linear combination employing a second subset of the set of scalar coefficients, wherein the second linear combination is a linear combination of a standard deviation of a non-zero portion of the WIP distribution and the global aggregated quantity; and determining, for each selected range in the manufacturing sequence, a minimum of a first quantity and a second quantity, wherein the first quantity is the first throughput target for the selected range and the second quantity is the second throughput target. A program running on a processor platform can perform one of more of the local-moving-aggregate-quantity-based set of linear combinations and the standard-deviation-based linear combination.

According to yet another aspect of the present invention, a method of operating a manufacturing facility employing a work-in-progress management system is provided. The method includes: determining a throughput target for each of at least one product type that is manufactured in the manufacturing facility; determining lot priorities for each lot that belongs to the at least one product type based on the at least one throughput target; and dispatching lots based on the determined lot priorities in the manufacturing facility. The determining of each of the at least one throughput target is effected employing the steps of: determining, for each range in work-in-progress (WIP) distribution of a manufacturing sequence for the product type, a first throughput target given by a first linear combination employing a first subset of a set of scalar coefficients, wherein the first linear combination is a linear combination of a local moving aggregated quantity of an interval associated with the range and a global aggregated quantity of the WIP distribution; determining a second throughput target given by a second linear combination employing a second subset of the set of scalar coefficients, wherein the second linear combination is a linear combination of a standard deviation of a non-zero portion of the WIP distribution and the global aggregated quantity; and determining, for each selected range in the manufacturing sequence, a minimum of a first quantity and a second quantity, wherein the first quantity is the first throughput target for the selected range and the second quantity is the second throughput target. A program running on a processor platform can perform one or more of the set of linear combinations and the standard-deviation-based linear combination.

According to still another aspect of the present invention, a computer program product for determining a target throughput for a product type in a manufacturing facility is provided. The computer program product includes a computer readable storage medium having computer readable program code embodied therewith. The computer readable program code is configured to perform the steps of: determining, for each range in work-in-progress (WIP) distribution of a manufacturing sequence for the product type, a first throughput target given by a first linear combination employing a first subset of a set of scalar coefficients, wherein the first linear combination is a linear combination of a local moving aggregated quantity of an interval associated with the range and a global aggregated quantity of the WIP distribution; determining a second throughput target given by a second linear combination employing a second subset of the set of scalar coefficients, wherein the second linear combination is a linear combination of a standard deviation of a non-zero portion of the WIP distribution and the global aggregated quantity; and determining, for each selected range in the manufacturing sequence, a minimum of a first quantity and a second quantity, wherein the first quantity is the first throughput target for the selected range and the second quantity is the second throughput target. The computer program product can run on a processor platform to perform one or more of the local-moving-aggregate-quantity-based set of linear combinations and the standard-deviation-based linear combination.

BRIEF DESCRIPTION OF THE SEVERAL VIEWS OF THE DRAWINGS

FIG. 5 illustrates an exemplary system for determining a target throughput for a product type in a manufacturing facility according to an embodiment of the present invention.

DETAILED DESCRIPTION

Figure 1:
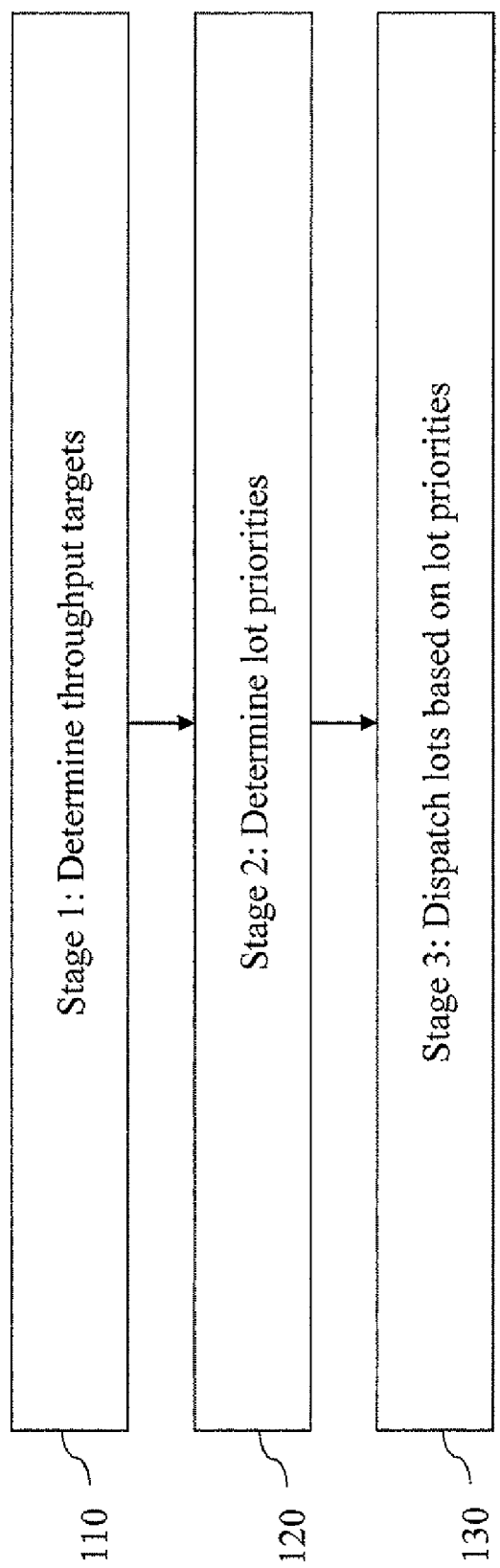
FIG. 1 is a flow chart showing a high-level sequence of control flow used to operate a manufacturing facility that employs a work-in-progress management system according to an embodiment of the present invention.

A method and a system for determining manufacturing throughput target for optimal utilization of a manufacturing facility that employs a work-in-progress (WIP) management system are now described in detail with accompanying figures.

As used herein, a "manufacturing facility" refers to any facility operated for the purpose of manufacturing goods.

As used herein, a "processing step" refers to step performed at a manufacturing facility in which a processing is performed to as a part of an overall manufacturing process.

As used herein, a "lot" refers to a unit quantity of products that are processed in a single processing step.

As used herein, a "range" refers to a group of processing steps through which a type of product, or a "product type" is planned to be processed within a unit time. A range may contain one or more processing steps. The unit time may be a day, or any fixed time interval.

As used herein, a "work-in-progress" or "WIP" refers to the quantity of products of a given product type within a given range.

As used herein, a "WIP distribution" refers to a complete set of WIP for a given product type.

As used herein, an "interval" is a set of ranges around a selected range. An interval of a WIP distribution is less than the entirety of ranges in the WIP distribution.

A "width" of an interval is the number of ranges in the set of ranges of the interval.

As used herein, an "interval adjacent to" a selected range or an "adjacent range" of the selected range is a set of ranges that are adjacent to the range. The interval may, or may not, include the selected range. In case the adjacent ranges do not include the selected range, at least one of the adjacent ranges is within 5 ranges from the selected range.

As used herein, a "work-in-progress management system" or a "WIP management system" refers to any system employed to manage a WIP distribution over time.

As used herein, a "scalar coefficient" is a coefficient having the value of a scalar that is a real number.

As used herein, a "semiconductor chip" refers to any chip including at least one semiconductor device.

As used herein, a "semiconductor device manufacturing facility" is a manufacturing facility that is employed to manufacture semiconductor chips that include semiconductor devices.

As used herein, an "aggregated quantity" is any mathematical quantity derived from a distribution of numbers to characterize the distribution with a single scalar that scales with the distribution itself. An aggregated quantity can be a mathematical average, a geometrical mean, a median, a maximum, any percentile between 0% percentile and 100%, and preferably from 1% percentile and 99% percentile. The mathematical average includes a statistically weighted mean in which weighting of WIP at each range may be uniform, skewed for initial ranges, skewed for terminal ranges, or non-uniform in any other way. The sum of all weights may, or may not be, 1.0. Because the aggregate quantity scales with the distribution, multiplying each quantity of an old distribution by a number to derive a new distribution results in new aggregate quantity that is the same as the product of an old aggregated quantity and the number.

As used herein, an aggregated quantity "derived from" a WIP distribution refers to an aggregated quantity in which the distribution of numbers of a WIP distribution.

As used herein, a "local moving aggregated quantity" is an aggregated quantity derived from an interval of a WIP distribution. The value of the local moving aggregate quantity changes with the selection of an associated range because the interval associated with the range changes as the selected range moves along the axis of the range parameter in a WIP distribution.

As used herein, a "local-moving-aggregate-quantity-based linear combination" is a linear combination including a local moving aggregate quantity as one of components therein.

As used herein, a "standard-deviation-based linear combination" is a linear combination including a standard deviation as one of components therein.

As used herein, a "local moving average" of an interval or a set of ranges is the average of all WIP in the interval or the set of ranges in which weighting of each range is uniform.

As used herein, a "global aggregated quantity" is an aggregated quantity derived from the entirety of a WIP distribution. The formula for assigning weight to derive the aggregated quantity may, or may not, assign the weight of zero to all ranges having zero as the WIP.

As used herein, an "average WIP" is a mathematical average, with equal weight, of all non-zero WIP in a WIP distribution.

A "global aggregated quantity" is an aggregated quantity derived from an entirety of a non-zero portion of a WIP distribution.

Referring to FIG. 1, a high-level sequence of control flow used to operate a manufacturing facility is shown. The manufacturing facility employs a work-in-progress management system to control the flows of products during manufacturing. A computer based system can be employed for each stage of the control flow. The stages of the control flow in FIG. 1 include a first stage 110, i.e., "stage 1," a second stage, i.e., "stage 2," and a third stage 130, i.e., "stage 3."

At the first stage 110, throughput targets are determined for each product type in the manufacturing facility. The manufacturing facility manufactures at least one product type, and typically a plurality of product types. A throughput target is determined for each of at least one product type that is manufactured in the manufacturing facility.

At the second stage 120, lot priorities are determined for each lot. Where at least one product type is manufactured in the manufacturing facility and at least one throughput target corresponding to each of the at least one product type becomes available at the first stage 110, lot priorities are determined for each lot that belongs to the at least one product type based on the at least one throughput target. Lot priorities can be determined based on consideration of maximizing the total throughput from the manufacturing facility in terms of total count of manufactured products, the revenue that each product type generates, the profit margin for each product type, and/or strategic considerations for expediting manufacture of one type of products over another type of products at the second stage 120.

At the third stage 130, lots are dispatched, i.e., processed, based on lot priorities, which are determined at the second stage, in the manufacturing facility. Typically, a computer based production control system is employed to instruct each processing tool which lots are to be processed next. In a non-limiting example, the product type can be a type of semiconductor chip to be manufactured, and the manufacturing facility can be a semiconductor device manufacturing facility.

An algorithm for dispatching lots may be employed at the third stage 130 to optimize expeditious and productive operation of the manufacturing facility. Oftentimes, expeditious operation of a manufacturing facility and productive operation of the manufacturing facility can be contradictory. For example, enabling expeditious production of products in high priority lots at the expense of slower production of products in low priority lots can reduce the total production from the manufacturing facility, and vice versa. The balance between the expeditious operation and the productive operation of a manufacturing facility can be determined based on business needs and the peculiar trade-off characteristics of the manufacturing facility between expeditious operation and productive operation.

Figure 2:
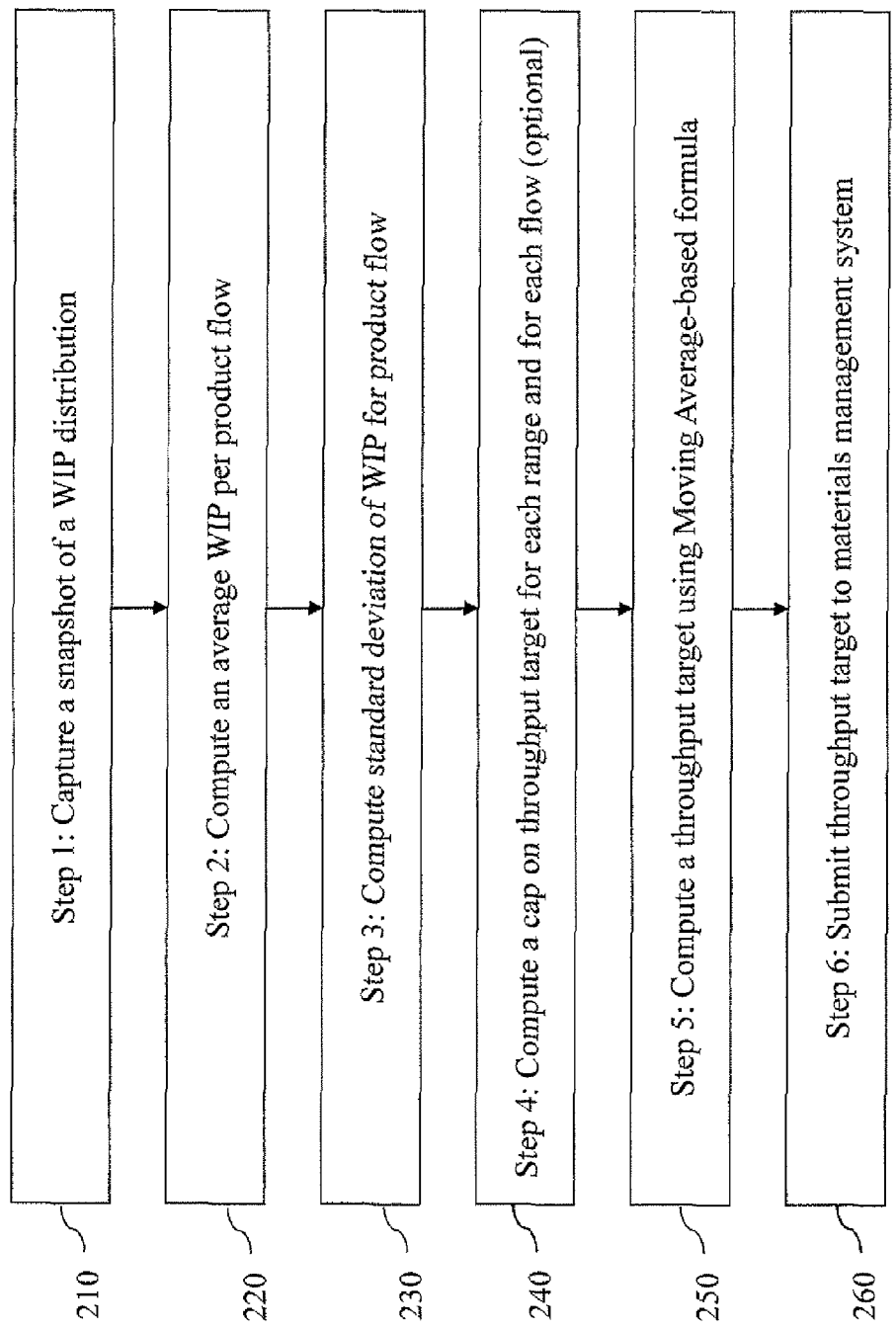
FIG. 2 is a flow chart showing a sequence of steps employed to determine a throughput target for each of at least one product type that is manufactured in a manufacturing facility according to an embodiment of the present invention.

Referring to FIG. 2, steps that can be employed to implement the first stage 110 in FIG. 1 are shown. The steps include a first step 210, a second step 220, a third step 230, a fourth step 240, a fifth step 250, and a sixth step 260. While the present invention is described for a single product type for which steps 210-260 are applied once, the first through sixth steps (210-260) can be performed repeatedly for each product type that is manufactured in the manufacturing facility if a plurality of product types is manufactured in the manufacturing facility.

Referring to the first step 210, a snapshot of a WIP distribution for a given product type is identified. Typically, the WIP distribution for each product is tracked by an automated system employing at least one computer. The automated system can generate a snapshot of the WIP distribution for each product at regular intervals, e.g., every hour.

The snapshot of the WIP distribution includes a list of ranges for the product type, and WIP for each range in the product type. In case the product type is semiconductor chips manufactured in semiconductor wafers, the unit of the WIP for each range can be the count of individual semiconductor wafers within each range, or can be the count of lots that include typically from 1 to 25 semiconductor wafers. A typical semiconductor manufacturing process can include from 200 to 1,000 processing steps, which are grouped into ranges. The number of ranges can be from 30 to 120 ranges depending on the complexity of the semiconductor device. For example, the ranges are formed by grouping a number of processing steps such that each range has comparable processing time. For example, ranges can be selected to have about 24 hours of total processing time for the processing steps therein. Preferably, the WIP includes the products that are "on hold," i.e., temporarily prohibited from processing for any reason.

Referring to step 220, an average of work-in-progress (WIP) distribution per product flow is calculated from the WIP distribution for the product type. The average WIP is calculated by identifying the total count of ranges that have zero WIP, i.e., ranges that do not have any product to be processed. For illustrative purposes, the total number of ranges for the product type is herein referred to as #TNR, and the number of ranges having no WIP is herein referred to as #RZW. Next, all WIP from every range for the product is summed up. For illustrative purposes, the sum of all WIP from every range for the product is herein referred to as #AW. Then, the sum of all WIP from every range for the product is divided by the number of ranges having non-zero WIP to generate the average WIP.

In a simple example, the average of the WIP, AveWIP, is computed by the formula: $AveWIP = \#AW/(\#TNR - \#RZW)$. In other words, the average WIP is calculated by generating a modified WIP distribution in which all ranges with no WIP are excluded from the WIP distribution, and by taking an average of the WIP for each range within the modified WIP distribution.

Referring to step 230, the standard deviation of WIP is calculated from the product flow. The standard deviation of WIP, or "σ(WIP)" herein, refers to the standard deviation of the modified WIP distribution that excludes the ranges for no WIP. Thus, the standard deviation of WIP is given by:

$$\sigma(WIP) = \sqrt{\frac{\sum_{i=1}^{(\#TNR-\#RZW)} (WIP(i) - AveWIP)^2}{(\#TNR-\#RZW)}},$$

wherein WIP(i) refers to the WIP for an i-th range having a non-zero WIP, and the summation runs over (#TNR−#RZW) number of ranges.

Referring to step 240, which is an optional step that may, or may not, be employed in the methods of the instant application, an external cap on throughput target is computed for each range for the product type. The external cap on throughput target on any range is the maximum throughput for that range, and may be imposed for a variety of reasons. For example, the external cap on throughput target on a range can be imposed by inherent limitation on tool capacity, by preferences in tool capacity allocation across products and/or product ranges, or can be imposed by other operational limitations such as feasibility of coordination with preceding or subsequent steps and/or feasibility of supervision, for example, by an operator.

Referring to step 250, a throughput target is calculated employing a moving average-based formula. The throughput target is a single scalar having the unit of "WIP's per unit time." A throughput target is calculated for each range in the product type, including the ranges that have a zero WIP (no WIP) in the snapshot of the WIP distribution. In case multiple product types are manufactured in the manufacturing facility, a throughput target is calculated for each range for each product type.

Figure 3:
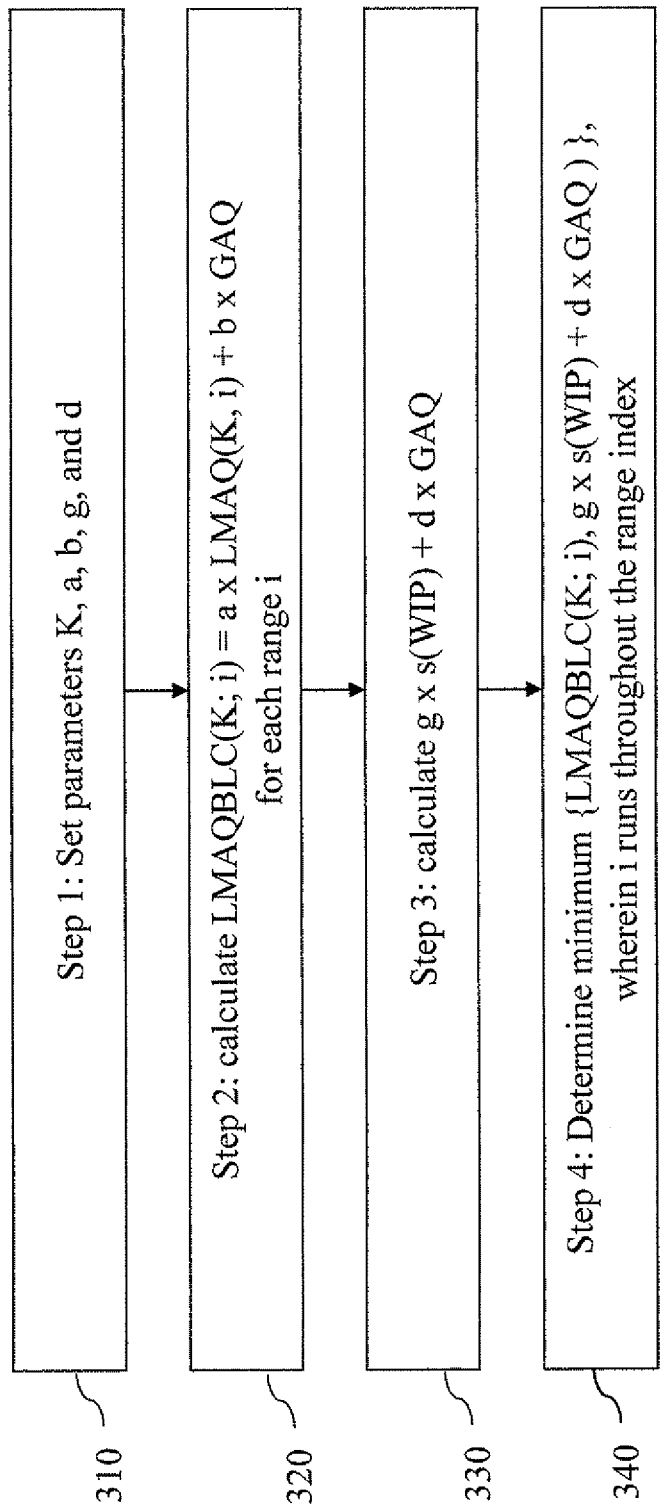
FIG. 3 is a flow chart showing a sequence of steps employed to compute a throughput target using Moving Average-based formula according to an embodiment of the present invention.

Referring to FIG. 3, a flow chart of steps that can be employed to implement step 250 in FIG. 2 is shown. The flow chart in FIG. 3 includes steps 310, 320, 330, and 340, which can collectively constitute the step 250 in FIG. 2.

Referring to step 310, a set of scalar coefficients is determined. The set of scalar coefficients can include a width parameter K, a first weighting factor α that is multiplied to each of the moving average, a second weighting factor β that is multiplied to the average WIP as a component in each linear combination in the set of linear combinations, a third weighting factor γ that is multiplied to the standard deviation of the WIP distribution, and a fourth weighting factor δ that is multiplied to the average WIP as a component in the standard-deviation-based linear combination. The set of scalar coefficients can be inputted into a computer employing input means, which can be a manual input device or a data transmission device employing wireless or wired connection. The value of each scalar coefficient can be generated manually or by an automated algorithm run by the same computer or another computer.

K is an integer greater than 1. Typically, K is from 2% to 30% of the total number of ranges, and preferably from 5% to 15% of the total number of ranges. For example, if the total number of ranges is from 30 to 120, K can be from 2 to 36, and preferably from 2 to 18.

Each of α, β, γ, and δ are non-negative real numbers. Typically, the ratio of α to β is in a range from 0.1 to 10, and the ratio of γ to δ is in a range from 0.2 to 40, although lesser and greater values are also contemplated herein. Typically, the ratio of β to δ is from 0.3 to 3.0, and preferably 1.0, i.e., β and δ can have a same value.

Referring to step 320, a set of first linear combinations for each range in a manufacturing sequence for the product type is determined employing the set of scalar coefficients. Each first linear combination in the set of first linear combinations is a linear combination of a local moving aggregated quantity of an interval associated with said range and a global aggregated quantity (GAQ) of said WIP distribution. Any type of local moving aggregated quantity for the WIP distribution provided that each local moving aggregated quantity is derived from the associated interval around the range i. Any type of global aggregated average can be employed. For example, the local moving aggregated quantity for each range i can be a moving average MA(K, i) around the range i. The global aggregated quantity can be the average WIP of the WIP distribution. This linear combination for the i-th range is a local-moving-aggregate-quantity-based linear combination for an i-th range, or a "LMAQBLC(K, i)." i can be any index for the ranges for the product type for which calculation of the LMAQBLC(K, i) is possible. A complete set of local-moving-aggregate-quantity-based quantities include all local-moving-aggregate-quantity-based linear combinations that can be calculated.

The width parameter K determines the width of the ranges that is employed to calculate a local moving aggregated quantity LMAQ(K, i) around the i-th range in the WIP distribution. In one embodiment, the local moving aggregated quantity LMAQ(K, i) is the local moving average MA(K,I). The MA(K, i) can be a backward average of K numbers of WIP's for ranges from i−K+1 to I, inclusive. In other words, all WIP's for ranges from i−K+1 to i are added to calculate a sum, which is divided by K. The backward average represents an average WIP for ranges that the products in the product type have already been processed through. Alternately, the MA(K, i) can be a forward average of K numbers of WIP's for ranges from i to i+K−1. In this case, all WIP's for ranges from i to i+K−1 are added to calculate a sum, which is divided by K. The forward average represents an average WIP for ranges that the products in the product type are expected to be processed through in the near future. Yet alternately, the MA(K, i) can be a central average of K numbers of WIP's for ranges centered around i. If K is an odd number, all WIP's for ranges from i+(K−1)/2 to i+(K−1)/2 are added to calculate a sum, which is divided by K. If K is an even number, all WIP's for ranges from i+(K−2)/2 to i+(K+2)/2 is added to one-half times the sum of the WIP for i−K/2 and the WIP for i+K/2 to calculate a sum, which is divided by K.

In other words, the moving average MA(K, i) around the i-th range calculated employing a backward average scheme is given by $$A(K, i) = \frac{\sum_{j=i-K+1}^{i} WIP(j)}{K}.$$

The moving average MA(K, i) around the i-th range calculated employing a forward average scheme is given by:

$$A(K, i) = \frac{\sum_{j=i}^{i+K-1} WIP(j)}{K}.$$

If K is an odd number, the moving average MA(K, i) around the i-th range calculated employing a central average scheme is given by:

$$A(K, i) = \frac{\sum_{j=i-(K-1)/2}^{i+(K-1)/2} WIP(j)}{K}.$$

If K is an even number, the moving average MA(K, i) around the i-th range calculated employing a central average scheme is given by:

$$A(K, i) = \frac{\sum_{j=i-(K-2)/2}^{i+(K-2)/2} WIP(j) + \frac{(WIP(i-K/2) + WIP(i+K/2))}{2}}{K}.$$

Further, as an alternative to uniform weighting of all WIP's within the width K, a non-uniform weighting of WIP's within the width K can be employed for each of forward average scheme, a backward average scheme, and a central average scheme. The values for the LMAQBLC(K, i) is derived from the values of the MA(K, i), α and β employing the formula, LMAQBLC(K;i)=α×MA(K,i)+β×AveWIP for each range i. MA(K, i) is the moving average of the WIP distribution around range i for the width of K, α is the first weighting factor a that is multiplied to each of the moving average, and β is the second weighting factor that is multiplied to the average WIP as a component in each first linear combination in the set of first linear combinations. The value of LMAQBLC(K, i) is affected by the width parameter K and the method employed to calculate the moving average, MA(K, i). The coefficients of the LMAQBLC(K, i) are α and β, which are predetermined as provided at step 310 of FIG. 3.

Referring to step 330, a second linear combination is determined employing the set of scalar coefficients, and particularly γ and δ. The second linear combination is a standard-deviation-based linear combination. The standard-deviation-based linear combination is a linear combination of a standard deviation of a WIP distribution for the selected product type and the global aggregated quantity, which is herein referred to as GAQ. The global aggregate quantity is the same as in the set of the first linear combinations determined at step 320. The standard-deviation-based linear combination is given by γ×σ(WIP)+δ×GAQ. σ(WIP) is the standard deviation of the WIP distribution as determined at step 230 of FIG. 2, γ is a third weighting factor that is multiplied to the standard deviation of the WIP distribution, and δ is a fourth weighting factor that is multiplied to the average WIP as a component in the standard-deviation-based linear combination. The coefficients of the standard-deviation-based linear combination are γ and δ, which are predetermined as provided at step 310 of FIG. 3. For example, the global aggregate quantity can be, but is not limited to, an average WIP of the WIP distribution. In this case, the standard-deviation-based linear combination is given by γ×σ(WIP)+δ×AveWIP.

Referring to step 340, the local-moving-aggregate-quantity-based set of linear combinations as determined at step 320 and the standard-deviation-based linear combination as determined at step 330 are compared to determine the throughput target for each range in a product type. The minimum value between the local-moving-aggregate-quantity-based linear combination for a range and the standard-deviation-based linear combination is used as the throughput target for that range. In other words, the quantity of minimum {LMAQBLC(K; i), γ×σ(WIP)+δ×GAQ)} is determined and assigned as the throughput target for the i-th range. The "minimum {arguments}" is a function that takes the minimum number among the two numbers in the arguments in the brackets to the right. A separate throughput target is calculated for each range for the product type. i runs throughout the range index for the product type. The minimum is set as the throughput target for the range i of the manufacturing sequence of the product type.

Each of α, β, γ, and δ are non-negative real numbers. Typically, the ratio of α to β is in a range from 0.1 to 10, and the ratio of γ to δ is in a range from 0.2 to 40, although lesser and greater values are also contemplated herein. Typically, the ratio of β to δ is from 0.3 to 3.0, and preferably 1.0, i.e., β and δ can have a same value.

Optionally, setting of the values for α, β, γ, and δ can be an iterative process, in which steps 310, 320, and 330 may be repeated to fine-tune the values for α, β, γ, and δ. In a non-limiting illustrative example, β and δ can be initially set at 1.0. α can be set at a number at which an average of α×MA(K, i) over all i matches or is comparable with AveWIP during a high productivity period in the manufacturing facility. γ can be set at a number at which a γ×σ(WIP) matches or is comparable with AveWIP during a high productivity period in the manufacturing facility. In addition, the values for α, β, γ, and δ can be fine-tuned to optimize the productivity from the manufacturing facility based on specific needs or unique characteristics of the manufacturing facility.

In one embodiment, the settings of the values for α, β, γ, and δ can be selected such that the second linear combination is greater than first linear combinations more often than not. The frequency at which the values of the first linear combinations exceed the value of the second linear combination can be selected to be at any predetermined range based on accumulated data from the operation of the manufacturing facility. For example, the target for the frequency at which the values of the first linear combinations exceed the value of the second linear combination can be set to be less than 50%, and typically less than 20%. In some instances, the values of α, β, γ, and δ can also be selected so that the first linear combination is less than the value of the second linear combination for all comparisons of the first linear combinations and the second linear combination. In this case, the second linear combination functions as a cap, or a maximum, on most of the values of minimum {LMAQBLC(K; i), γ×σ(WIP)+δ×GAQ)}.

In another embodiment, the settings of the values for α, β, γ, and δ can be selected such that the second linear combination is comparable to the value of first linear combinations most of the time. In this case, the second linear combination functions as a cap at about 50% of the time most of the time.

If an external cap is employed at step 240, the value of minimum {LMAQBLC(K; i), γ×σ(WIP)+δ×GAQ)} for each range is compared with the external cap to determine which quantity is a lesser quantity of the two. If the external cap is lesser than the value of minimum {LMAQBLC(K; i), γ×σ(WIP)+δ×GAQ)} for any range, the value of the external cap, which may be the same for all ranges or may be discrete numbers for each range, replaces the value of minimum {LMAQBLC(K; i), γ×σ(WIP)+δ×GAQ)} as the throughput target for that range. Otherwise, the value of the throughput target for each range is not affected. If an external cap is not employed, i.e., if step 240 is omitted, the value of the throughput target for each range is not affected.

Steps 310, 320, 330, and 340 collectively correspond to step 250, which determine the throughput target for the product type. Thereafter, step 260 is performed, during which the throughput target for the product is submitted to a materials management system. An output means that is configured to output the minimum as the throughput target for the product type can be employed to transmit this information to the materials management system.

Steps 210, 220, 230, 240, 250, and 260 collectively constitute stage 110 in FIG. 1. As discussed above, steps 120 and 130 are performed to control the flow of products in the manufacturing facility as well as generation of instructions for operators as to which products are to be run in each machine. Typically, a materials management system is employed to automatically provide the functions of stages 120 and 130.

Figure 4:
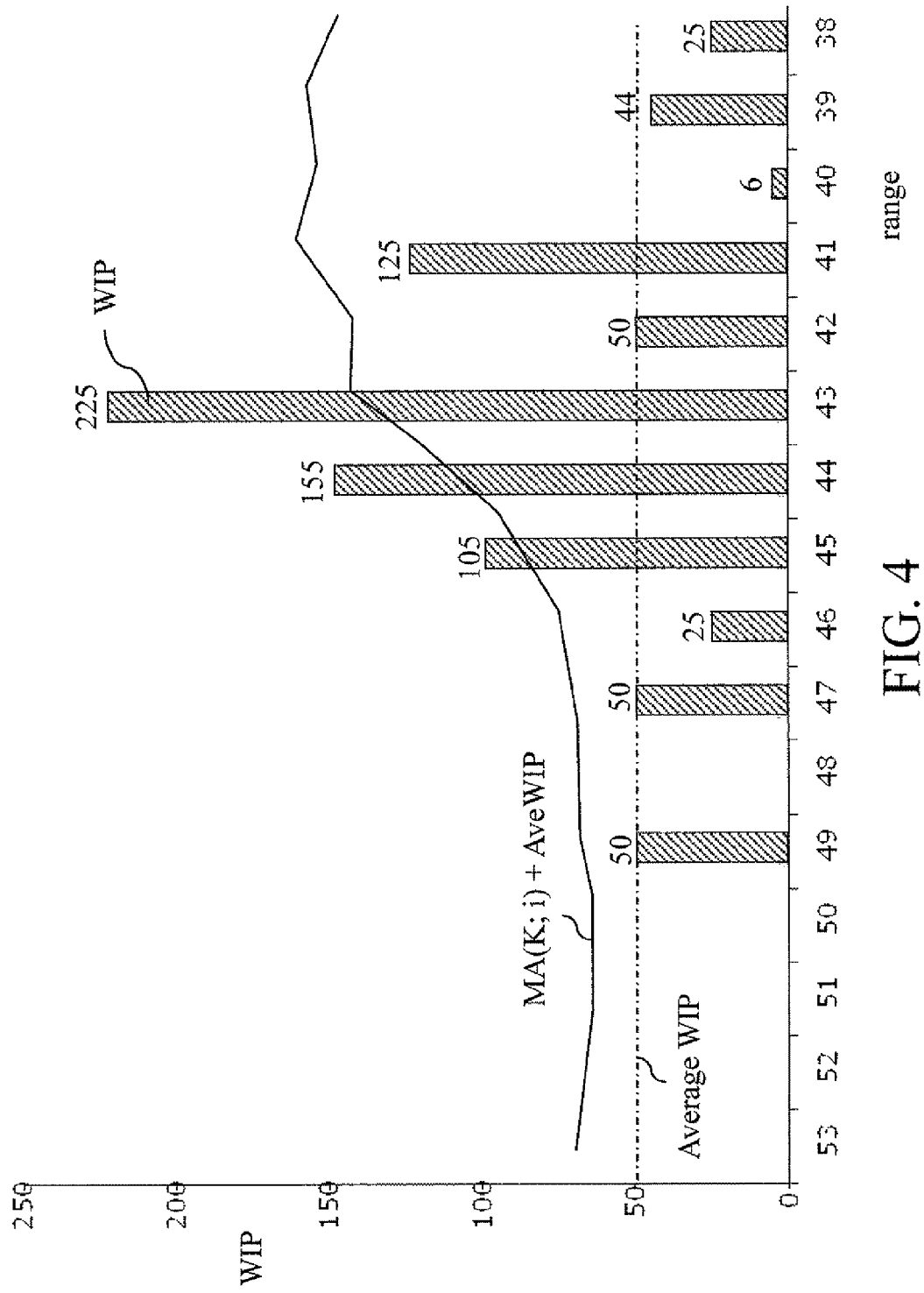
FIG. 4 is an exemplary WIP distribution on which AveWIP and MA(K, i)+AveWIP are juxtaposed according to an embodiment of the present invention.

Referring to FIG. 4, an exemplary WIP distribution in a semiconductor manufacturing facility is shown as a histogram. The labels on the horizontal axis represent ranges for a single product type. The labels on the vertical axis represent the WIP for each range. In addition to the WIP, the AveWIP for the product type is juxtaposed as a line including dashes separated by dots. Further, local-moving-aggregate-quantity-based quantities LMAQBLC(K, i) given by the formula, MA(K,i)+AveWIP (i.e., $\alpha=1$ and $\beta=1$), are juxtaposed as a solid line.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 5, an exemplary system 900 for determining a target throughput for a product type in a manufacturing facility is shown. The exemplary system 900 can be employed to perform steps 210-260 in FIG. 2, which correspond to stage 110 in FIG. 1. Optionally, the exemplary system 900 can also be employed to perform stages 120 and/or 130 in FIG. 1. The exemplary system includes a computing device that is configured to perform program instructions. The computing device can include a memory and a processor device in communication with the memory. The program instructions can configure the computing device to perform the steps of embodiments of the present invention described above. The exemplary system 900 can be a computer-based system in which the methods of the embodiments of the invention can be carried out by an automated program of machine-executable instructions to determine throughput targets, set lot priorities based on these throughput targets, and dispatch lots for processing based on their priorities.

The computer-based system includes a processing unit 910, which can be a computing device and houses a processor device, a memory and other systems components (not shown expressly in the drawing) that implement a general purpose or special purpose processing system, or can be a computer that can execute a computer program product. The computer program product can comprise data storage media, such as a compact disc, which can be read by the processing unit 910 through a disc drive 920. Alternately or in addition, the data storage media can be read by any means known to the skilled artisan for providing the computer program product to the general purpose processing system to enable an execution thereby. The exemplary system 900 can include a data interface device 905 that is configured to capture and/or transmit snapshots of the WIP distribution of at least one product type that is manufactured in a manufacturing facility.

The exemplary system can be employed to determine throughput targets, set lot priorities based on these throughput targets, and dispatch lots for processing based on their priorities. The system includes at least the data interface device 905, a memory, and a processor device in communication with the memory. The memory and the processor device are provided within the processing unit 910. The exemplary system can be configured to perform a method including the steps 210-260 of FIG. 2.

A data storage device that is programmable and readable by a machine and tangibly embodying or storing a program of machine-executable instructions that are executable by the machine to perform the methods described herein are also provided. For example, the automated program can be embodied, i.e., stored, in a machine-readable data storage devices such as a hard disk, a CD ROM, a DVD ROM, a portable storage device having an interface such as a USB interface, a magnetic disk, or any other storage medium suitable for storing digital data. The program of machine-executable instructions can be employed to determine throughput targets, set lot priorities based on these throughput targets, and dispatch lots for processing based on their priorities, employing a system of the present invention.

The computer program product can comprise all the respective features enabling the implementation of the inventive method described herein, and which is able to carry out the method when loaded in a computer system. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product can be stored on hard disk drives within the processing unit 910, as mentioned, or can be located on a remote system such as a server 930, coupled to the processing unit 910, via a network interface such as an Ethernet interface. A monitor 940, a mouse 950 and a keyboard 960 are coupled to the processing unit 910, to provide user interaction. The keyboard 960 and/or the mouse 950 can function as input means described above. The monitor can function as output means described above. Further, the data interface device 905 can function as input means and/or output means if the transmission of snapshots of the WIP distribution and/or the throughput target is automated. A scanner 980 and a printer 970 can be provided for document input and output. The printer 970 is shown coupled to the processing unit 910 via a network connection, but can be coupled directly to the processing unit 910. The scanner 980 is shown coupled to the processing unit 910 directly, but it should be understood that peripherals might be network coupled, or direct coupled without affecting the ability of the processing unit 910 to perform the method of the invention.

While the present invention has been particularly shown and described with respect to preferred embodiments thereof, it will be understood by those skilled in the art that the foregoing and other changes in forms and details may be made without departing from the spirit and scope of the present invention. For example, variations that combine various steps of the first, second, and third exemplary programs in a single program may be employed. It is therefore intended that the present invention not be limited to the exact forms and details described and illustrated, but fall within the scope of the appended claims.

What is claimed is:

1. A system for determining a set of target throughputs for a product type in a manufacturing facility, said system comprising a computer and output means, wherein said computer is configured to perform the steps of:

determining, for each range in work-in-progress (WIP) distribution of a manufacturing sequence for said product type, a first throughput target given by a first linear combination employing a first subset of a set of scalar coefficients, wherein said first linear combination is a linear combination of a local moving aggregated quantity of an interval associated with said range and a global aggregated quantity of said WIP distribution;

determining a second throughput target given by a second linear combination employing a second subset of said set of scalar coefficients, wherein said second linear combination is a linear combination of a standard deviation of a non-zero portion of said WIP distribution and said global aggregated quantity; and determining, for each selected range in said manufacturing sequence, a minimum of a first quantity and a second quantity, wherein said first quantity is said first throughput target for said selected range and said second quantity is said second throughput target, wherein said output means is configured to output a set of said minimums as a set of throughput targets for corresponding ranges in said product type.

2. The system of claim 1, wherein said system further comprises input means for inputting said set of scalar coefficients into said computer.

3. The system of claim 1, wherein said local moving aggregated quantity is a local moving average, and said global aggregated quantity is an average WIP given by a mathematical average, with equal weight, of all non-zero WIP in said WIP distribution.

4. The system of claim 1, wherein said first subset of said set of scalar coefficients includes a width parameter K, a first weighting factor that is multiplied to each of said local moving aggregated quantity, a second weighting factor that is multiplied to said global aggregated quantity as a component in each of said first linear combinations, and said second subset of said set of scalar coefficients includes a third weighting factor that is multiplied to said standard deviation, and a fourth weighting factor that is multiplied to said global aggregated quantity as a component in said second linear combination.

5. The system of claim 1, wherein said first linear combination for each range i is given by a local-moving-aggregate-quantity-based quantity for an i-th range, LMAQBLC(K, i), wherein LMAQBLC(K;i)=$\alpha \times MA(K,i)+\beta \times AveWIP$ for each range i, MA(K, i) is a local moving average of said WIP distribution around range i for a width of K, AveWIP is an average WIP given by a mathematical average, with equal weight, of all non-zero WIP in said WIP distribution, $\alpha$ is a first weighting factor a that is multiplied to each of said local moving average, and $\beta$ is a second weighting factor that is multiplied to said average WIP as a component in each first linear combination.

6. The system of claim 5, wherein said $\alpha$ and said $\beta$ are non-negative real numbers, and wherein a ratio of $\alpha$ to $\beta$ is in a range from 0.1 to 10.

7. The system of claim 5, wherein said second linear combination is given by $\gamma \times \sigma(WIP)+\delta \times AveWIP$, wherein $\sigma(WIP)$ is a standard deviation of said WIP distribution, $\gamma$ is a third weighting factor that is multiplied to said standard deviation of said WIP distribution, and $\delta$ is a fourth weighting factor that is multiplied to said average WIP as a component in said second linear combination.

8. The system of claim 7, wherein said $\gamma$ and said $\delta$ are non-negative real numbers, and wherein a ratio of $\gamma$ to $\delta$ is in a range from 0.2 to 40.

9. The system of claim 8, wherein $\beta$ and $\delta$ have a same value.

10. The system of claim 5, wherein said K is an integer greater than 1, and wherein said MA(K, i) is selected from a backward average of K numbers of WIP's for ranges from i−K+1 to i, a forward average of K numbers of WIP's for ranges from i to i+K−1, and a central average of K numbers of WIP's for ranges centered around i.

11. The system of claim 1, wherein said product type is a type of semiconductor chip and said manufacturing facility is a semiconductor device manufacturing facility.

12. A method of determining a target throughput for a product type in a manufacturing facility, said method comprising:

determining, for each range in work-in-progress (WIP) distribution of a manufacturing sequence for said product type, a first throughput target given by a first linear combination employing a first subset of a set of scalar coefficients, wherein said first linear combination is a linear combination of a local moving aggregated quantity of an interval associated with said range and a global aggregated quantity of said WIP distribution;

determining a second throughput target given by a second linear combination employing a second subset of said set of scalar coefficients, wherein said second linear combination is a linear combination of a standard deviation of a non-zero portion of said WIP distribution and said global aggregated quantity; and determining, for each selected range in said manufacturing sequence, a minimum of a first quantity and a second quantity, wherein said first quantity is said first throughput target for said selected range and said second quantity is said second throughput target.

13. The method of claim 12, wherein further comprising inputting said set of scalar coefficients into said computer manually or automatically from a database.

14. The method of claim 12, wherein said local moving aggregated quantity is a local moving average, and said global aggregated quantity is an average WIP given by a mathematical average, with equal weight, of all non-zero WIP in said WIP distribution.

15. The method of claim 12, wherein said first subset of said set of scalar coefficients includes a width parameter K, a first weighting factor that is multiplied to each of said local moving aggregated quantity, a second weighting factor that is multiplied to said global aggregated quantity as a component in each of said first linear combinations, and said second subset of said set of scalar coefficients includes a third weighting factor that is multiplied to said standard deviation, and a fourth weighting factor that is multiplied to said global aggregated quantity as a component in said second linear combination.

16. The method of claim 12, wherein said first linear combination for each range i is given by a local-moving-aggregate-quantity-based quantity for an i-th range, LMAQBLC(K, i), wherein LMAQBLC(K;i)=$\alpha \times MA(K,i)+\beta \times AveWIP$ for each range i, MA(K, i) is a local moving average of said WIP distribution around range i for a width of K, AveWIP is an average WIP given by a mathematical average, with equal weight, of all non-zero WIP in said WIP distribution, $\alpha$ is a first weighting factor a that is multiplied to each of said local moving average, and $\beta$ is a second weighting factor that is multiplied to said average WIP as a component in each first linear combination.

17. The method of claim 16, wherein said second linear combination is given by $\gamma \times \sigma(WIP)+\delta \times AveWIP$, wherein $\sigma(WIP)$ is a standard deviation of said WIP distribution, $\gamma$ is a third weighting factor that is multiplied to said standard deviation of said WIP distribution, and $\delta$ is a fourth weighting factor that is multiplied to said average WIP as a component in said second linear combination.

18. The method of claim 16, wherein said K is an integer greater than 1, and wherein said MA(K, i) is selected from a backward average of K numbers of WIP's for ranges from i−K+1 to i, a forward average of K numbers of WIP's for ranges from i to i+K−1, and a central average of K numbers of WIP's for ranges centered around i.

19. A method of operating a manufacturing facility employing a work-in-progress management system, wherein said method includes:

determining a throughput target for each of at least one product type that is manufactured in said manufacturing facility;

determining lot priorities for each lot that belongs to said at least one product type based on said at least one throughput target; and dispatching lots based on said determined lot priorities in said manufacturing facility, wherein said determining of each of said at least one throughput target is effected employing the steps of:

determining, for each range in work-in-progress (WIP) distribution of a manufacturing sequence for said product type, a first throughput target given by a first linear combination employing a first subset of a set of scalar coefficients, wherein said first linear combination is a linear combination of a local moving aggregated quantity of an interval associated with said range and a global aggregated quantity of said WIP distribution;

determining a second throughput target given by a second linear combination employing a second subset of said set of scalar coefficients, wherein said second linear combination is a linear combination of a standard deviation of a non-zero portion of said WIP distribution and said global aggregated quantity; and determining, for each selected range in said manufacturing sequence, a minimum of a first quantity and a second quantity, wherein said first quantity is said first throughput target for said selected range and said second quantity is said second throughput target, wherein an output means is configured to output a set of said minimums for all i's as a set of throughput targets for said product type.

20. The method of claim 19, wherein said local moving aggregated quantity is a local moving average, and said global aggregated quantity is an average WIP given by a mathematical average, with equal weight, of all non-zero WIP in said WIP distribution.

21. The method of claim 19, wherein said first subset of said set of scalar coefficients includes a width parameter K, a first weighting factor that is multiplied to each of said local moving aggregated quantity, a second weighting factor that is multiplied to said global aggregated quantity as a component in each of said first linear combinations, and said second subset of said set of scalar coefficients includes a third weighting factor that is multiplied to said standard deviation, and a fourth weighting factor that is multiplied to said global aggregated quantity as a component in said second linear combination.

22. A computer program product for determining a target throughput for a product type in a manufacturing facility, the computer program product comprising a tangible computer readable storage medium having computer readable program code embodied therewith, wherein said computer readable program code is configured to perform the steps of:

determining, for each range in work-in-progress (WIP) distribution of a manufacturing sequence for said product type, a first throughput target given by a first linear combination employing a first subset of a set of scalar coefficients, wherein said first linear combination is a linear combination of a local moving aggregated quantity of an interval associated with said range and a global aggregated quantity of said WIP distribution;

determining a second throughput target given by a second linear combination employing a second subset of said set of scalar coefficients, wherein said second linear combination is a linear combination of a standard deviation of a non-zero portion of said WIP distribution and said global aggregated quantity; and determining, for each selected range in said manufacturing sequence, a minimum of a first quantity and a second quantity, wherein said first quantity is said first throughput target for said selected range and said second quantity is said second throughput target.

23. The computer program product of claim 22, wherein said computer readable program code is configured to perform a further step of inputting said set of scalar coefficients into a computer through input means.

24. The computer program product of claim 22, wherein said first subset of said set of scalar coefficients includes a width parameter K, a first weighting factor that is multiplied to each of said local moving aggregated quantity, a second weighting factor that is multiplied to said global aggregated quantity as a component in each of said first linear combinations, and said second subset of said set of scalar coefficients includes a third weighting factor that is multiplied to said standard deviation, and a fourth weighting factor that is multiplied to said global aggregated quantity as a component in said second linear combination.

25. The computer program product of claim 22, wherein said first linear combination for each range i is given by a local-moving-aggregate-quantity-based quantity for an i-th range, $LMAQBLC(K, i)$, wherein $LMAQBLC(K;i)=\alpha \times MA(K,i)+\beta \times AveWIP$ for each range i, $MA(K, i)$ is a local moving average of said WIP distribution around range i for a width of K, AveWIP is an average WIP given by a mathematical average, with equal weight, of all non-zero WIP in said WIP distribution, $\alpha$ is a first weighting factor a that is multiplied to each of said local moving average, and $\beta$ is a second weighting factor that is multiplied to said average WIP as a component in each first linear combination.

* * * * *